United States Patent
Sun et al.

(10) Patent No.: US 9,369,509 B2
(45) Date of Patent: Jun. 14, 2016

(54) STREAM SHARING METHOD, APPARATUS, AND SYSTEM

(71) Applicant: INDUSTRIAL TECHNOLOGY RESEARCH INSTITUTE, Hsinchu (TW)

(72) Inventors: Wei-Cheng Sun, Kaohsiung (TW); Yi-Yu Su, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 231 days.

(21) Appl. No.: 14/276,672

(22) Filed: May 13, 2014

(65) Prior Publication Data

US 2015/0180930 A1    Jun. 25, 2015

(30) Foreign Application Priority Data

Dec. 25, 2013    (TW) .............................. 102148216 A

(51) Int. Cl.
*H04L 29/06*    (2006.01)
*H04L 29/08*    (2006.01)

(52) U.S. Cl.
CPC ............ *H04L 65/604* (2013.01); *H04L 67/104* (2013.01)

(58) Field of Classification Search
CPC ........................... H04L 65/604; H04L 67/104
See application file for complete search history.

(56) References Cited

U.S. PATENT DOCUMENTS

| 7,672,235 | B1* | 3/2010 | Lian | H04L 12/66 370/230 |
| 8,498,271 | B2 | 7/2013 | Lee et al. | |
| 8,712,883 | B1* | 4/2014 | Yang | H04L 12/14 375/240 |
| 2007/0094405 | A1* | 4/2007 | Zhang | H04N 7/17318 709/231 |

(Continued)

FOREIGN PATENT DOCUMENTS

| CN | 101697554 A | 4/2010 |
| CN | 101997890 A | 3/2011 |

(Continued)

OTHER PUBLICATIONS

Yoshiki Sakata et al., A Chunk Scheduling Based on Chunk Diffusion Ratio on P2P Live Streaming, 15th International Conference on Network-Based Information Systems, 2012, p 74-81.
Susu Xie et al., Coolstreaming: Design, theory, and practice, IEEE Transactions on Multimedia, 2007, p. 1661-1671, vol. 9, No. 8.

(Continued)

*Primary Examiner* — Philip Chea
*Assistant Examiner* — Wuji Chen
(74) *Attorney, Agent, or Firm* — Locke Lord LLP; Tim Tingkang Xia, Esq.

(57) ABSTRACT

Disclosed herein are a method and an apparatus for stream sharing, the apparatus comprising a buffer module, a sharing module, and an adjusting module. The sharing module receives a stream based on a first scheduling window and stores received segments of that stream in the buffer module, each received segment corresponding to a receiving time-point. A sharing request including a second scheduling window is received. Among the received segments the sharing module sends one or more requested segments, each of which further corresponding to a sending time-point. The adjusting module selectively adjusts the first scheduling window based on the corresponding receiving time-point and sending time-point of each requested segment. Also disclosed is a stream sharing system which comprises a stream source apparatus for hosting a stream and at least one stream sharing apparatus.

15 Claims, 9 Drawing Sheets

(56) References Cited

U.S. PATENT DOCUMENTS

| | | | | |
|---|---|---|---|---|
| 2009/0198907 A1* | 8/2009 | Speight | ............... | G06F 12/0862 711/137 |
| 2010/0146137 A1 | 6/2010 | Wu et al. | | |
| 2010/0332674 A1* | 12/2010 | van Gassel | ............ | H04L 67/104 709/231 |
| 2011/0216648 A1* | 9/2011 | Mehrotra | ................ | H04L 47/30 370/230 |
| 2013/0046857 A1 | 2/2013 | Howe | | |

FOREIGN PATENT DOCUMENTS

| | | |
|---|---|---|
| CN | 102811221 A | 12/2012 |
| CN | 103188522 A | 7/2013 |
| TW | 201118863 A | 6/2011 |
| TW | 201204011 A | 1/2012 |
| TW | 201320723 A | 5/2013 |
| WO | 2009002325 A1 | 12/2008 |

OTHER PUBLICATIONS

Ke Xu et al., Proxy caching for peer-to-peer live streaming, Computer Networks, 2010, p. 1229-1241, 54.

Nazanin Magharei et al., Prime: Peer-to-peer receiver-driven mesh-based streaming, IEEE/ACM Transactions on Networking, 2009, p. 1052-1065, vol. 17, No. 4.

Chen, Yi-Shuai et al., Scheduling piece requests blindly and randomly for peer-to-peer live streaming, ScienceDirect, 2010, p. 76-84, 17(2).

Dmitri Moltchanov, Service quality in P2P streaming systems, p. 1-51, Tampere University of Technology.

Hathairat Ketmaneechairat et al., Smart buffer management for different start video broadcasting, 2009, ICIS, Korea.

C. Goktug Gurler et al., Variable chunk size and adaptive scheduling window for P2P streaming of scalable video, IEEE 2012, p. 2253-2256.

Intellectual Property Office, Ministry of Economic Affairs, R. O. C, "Notice of Allowance", issued Jul. 17, 2015, Taiwan.

* cited by examiner

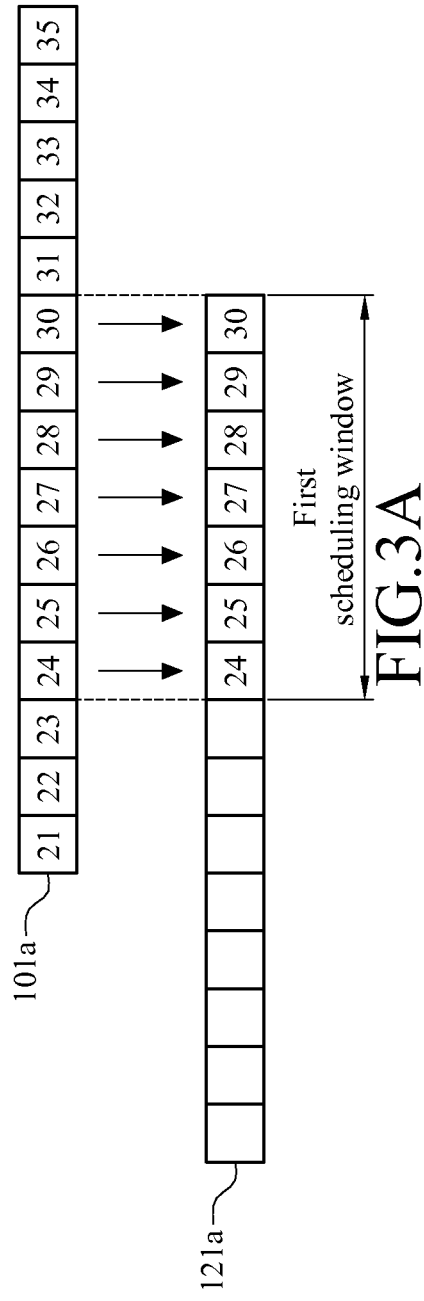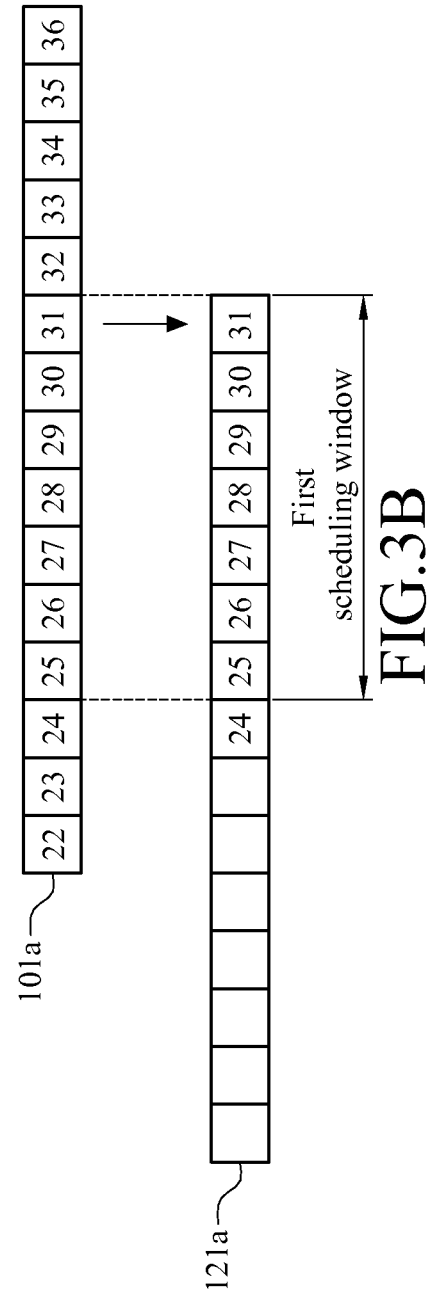

STREAM SHARING METHOD, APPARATUS, AND SYSTEM

CROSS-REFERENCE TO RELATED APPLICATIONS

This non-provisional application claims priority under 35 U.S.C. §119(a) on patent application No. 102148216 filed in Taiwan, R.O.C. on Dec. 25, 2013, the entire contents of which are hereby incorporated by reference.

TECHNICAL FIELD

The present disclosure relates to peer-to-peer networking, particularly to a method, an apparatus, and a system for stream sharing on a peer-to-peer network.

BACKGROUND

The conventional client-server architecture lacks scalability because a bottleneck is likely to form on the server side when there are a large number of clients requesting content. Given the low adoption rate of multicast within the Internet infrastructure, peer-to-peer networks, for their theoretically greater throughput, have become the top choice when it comes to real-time stream sharing.

A peer-to-peer network configured to provide streaming service normally comprises a plurality of nodes or peers. Segment by segment, these nodes download data from each other or from a content source, and upload data to other nodes when requested to do so. In particular, each node maintains a scheduling window; as the segments of a stream are downloaded, processed (e.g. a frame of a video stream being played), and discarded (or removed from the buffer for downloaded data), the scheduling window continuously slides forward, instructing the node to request certain segments. In practice, however, the nodes often make their scheduling windows as large as possible to cover the latest segments, while each node tends to obtain all the data it needs from one node, resulting in the overloading of a handful of nodes (usually including the content source) and even the tragedy of the commons, wherein the network is paralyzed and as inefficient as the client-server architecture.

SUMMARY

This disclosure provides a stream sharing method, a stream sharing apparatus, and a stream sharing system.

In the stream sharing method disclosed herein, a stream is received according to a first scheduling window. A plurality of received segments of the stream is stored in a buffer module. Each of the received segments corresponds to a receiving time-point. A sharing request comprising a second scheduling window is received, and one or more requested segments are sent according to the second scheduling window. Each requested segment is one of the received segments and further corresponds to a sending time-point. The first scheduling window is selectively adjusted according to the receiving time-point and the sending time-point corresponding to each requested segment.

The stream sharing apparatus disclosed herein comprises a buffer module, a sharing module, and an adjusting module. The sharing module is configured to receive a stream according to a first scheduling window, to store a plurality of received segments of the stream in the buffer module, to receive a sharing request comprising a second scheduling window, and to send one or more requested segments according to the second scheduling window. Each of the received segments corresponds to a receiving time-point; each of the one or more requested segments is one of the received segments and further corresponds to a sending time-point. The adjusting module is configured to selectively adjust the first scheduling window according to the receiving time-point and the sending time-point corresponding to each of the one or more requested segments.

The stream sharing system disclosed herein comprises a stream source apparatus, configured to host a stream, and at least one stream sharing apparatus. The stream sharing apparatus comprises a buffer module, a sharing module, and an adjusting module. The sharing module is configured to receive the stream from the stream source apparatus or a second stream sharing apparatus according to a first scheduling window, to store a plurality of received segments of the stream in the buffer module, to receive from a third stream sharing apparatus a sharing request comprising a second scheduling window, and to send one or more requested segments to the third stream sharing apparatus according to the second scheduling window. Each of the received segments corresponds to a receiving time-point; each of the one or more requested segments is one of the received segments and further corresponds to a sending time-point. The adjusting module is configured to selectively adjust the first scheduling window according to the receiving time-point and the sending time-point corresponding to each requested segment.

BRIEF DESCRIPTION OF THE DRAWING

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
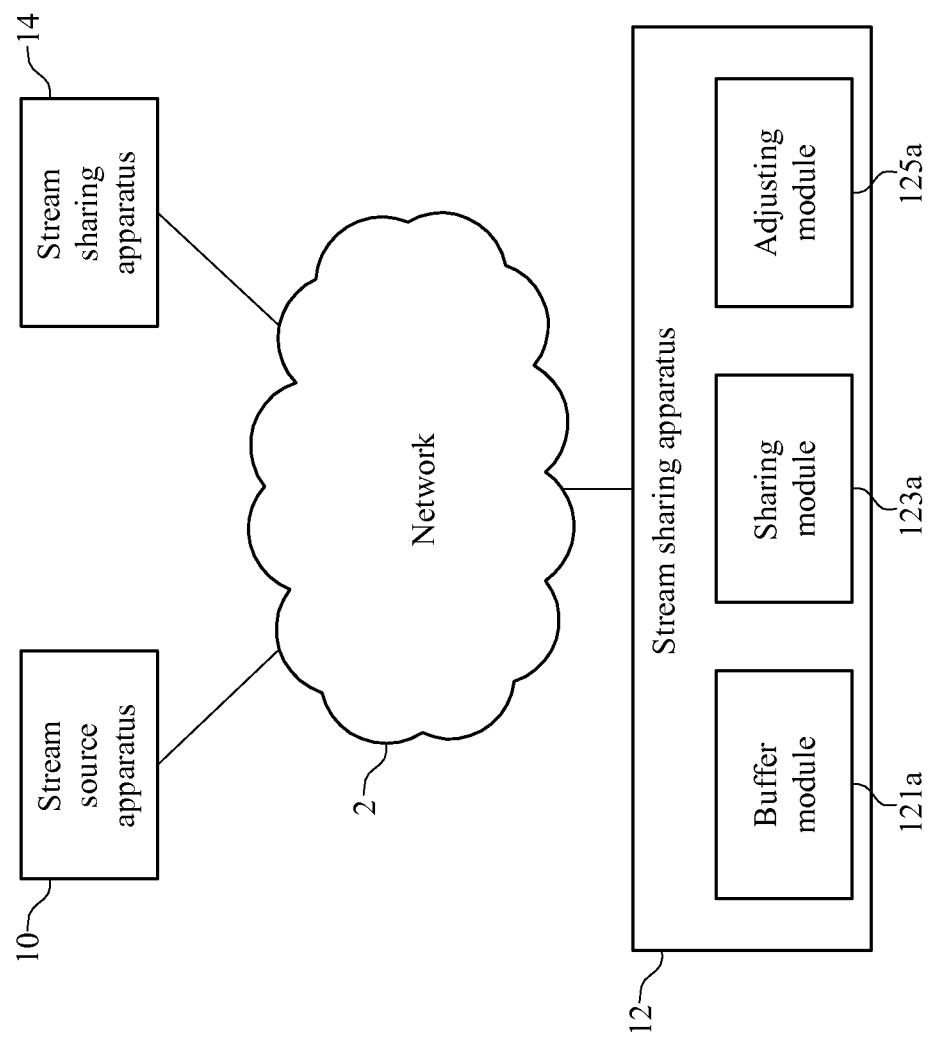
FIG. 1 is a block diagram of a stream sharing system comprising a number of stream sharing apparatus, in accordance with an embodiment of the present disclosure.

Please refer to FIG. 1. As shown in the block diagram, a simplified stream sharing system consists of a stream source apparatus 10 and two stream sharing apparatus 12 and 14, the apparatus 10, 12, and 14 communicating with each other through a network 2. The stream sharing apparatus 12 and 14 may be a tablet, a mobile telephone, a personal computer, or any computing device. In practice, there may be a plurality of stream source apparatus and even more stream sharing apparatus in the stream sharing system, and the peer-to-peer network of these stream sharing apparatus is overlaid on the network 2. The network 2 may be a local area network, a wide area network, or a combination thereof and may be wired or wireless as physical links. For the stream sharing apparatus, no matter from which node a stream is received through the peer-to-peer network, the stream can be traced to some stream source apparatus. It is worth noting that in the example of FIG. 1, streams may not be generated by the stream source apparatus 10, but instead by a video camera, a sound recording device, screen capture software, or a multimedia database that is coupled physically or through the network 2 to the stream source apparatus 10. In this case, the stream source apparatus 10 is a tracker, seed, and/or relay on the peer-to-peer network, or a provider of content delivery or reverse proxy services to the said stream generator.

Figure 2:
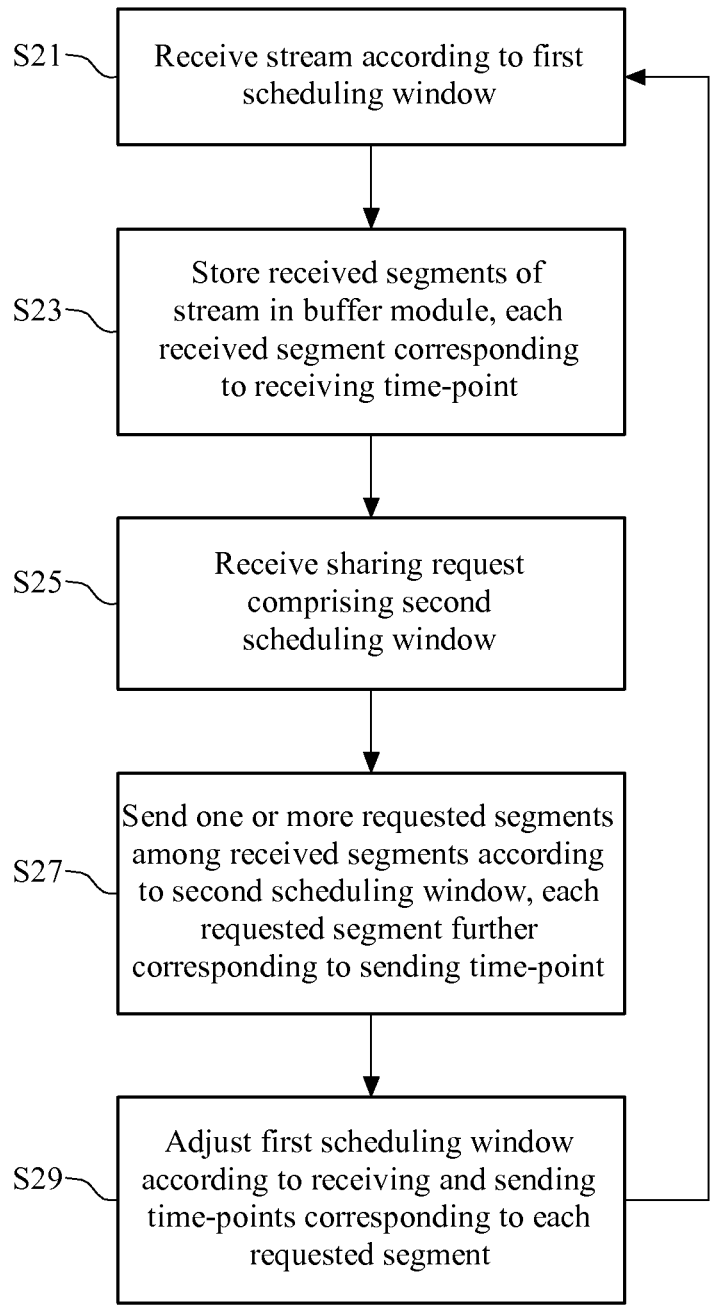
FIG. 2 is a flowchart of a stream sharing method, in accordance with an embodiment of the present disclosure.

The stream sharing apparatus 12, as an example, comprises a buffer module 121a, a sharing module 123a, and an adjusting module 125a, whose respective functions are detailed in FIG. 2. In the embodiment of the stream sharing method of FIG. 2, the stream sharing apparatus 12 keeps a first scheduling window, which data structure the adjusting module 125a is authorized to modify, but whose value is read-only to the sharing module 123a. In step S21, the sharing module 123a starts to receive a stream according to the first scheduling window. Suppose that because of some mechanism of peer selection, the stream is received from the stream source apparatus 10. In step S23, the sharing module 123a stores a plurality of segments of the stream in the buffer module 121a and records the time-point at which each segment is received. During the course of receiving the stream (step S21), recording receiving time-points of the segments, and storing segments (step S23), the sharing module 123a may receive in step S25 a sharing request from the stream sharing apparatus 14. The sharing request comprises a second scheduling window as kept by the stream sharing apparatus 14. In step S27, the sharing module 123a sends one or more of the received segments as requested with the second scheduling window and records the time-point at which each of these requested segments is sent. In other words, the sharing module of the stream sharing apparatus 14 starts to receive the stream from the stream sharing apparatus 12 according to the second scheduling window. In step S29, the adjusting module 125a selectively adjusts the first scheduling window according to the receiving and sending time-points corresponding respectively to the segments sent to the stream sharing apparatus 14, and the sharing module 123a continues to receive in step S21 the stream from the stream source apparatus 10 according to the (adjusted) first scheduling window.

Please refer to FIG. 3A to FIG. 5B for an exemplary walk-through of the stream sharing method mentioned above. As shown in FIG. 3A, at time 0, the buffer module 101a of the stream source apparatus 10 was filled with a plurality of segments, numbered 21 to 35 respectively, of a stream being casted. Here each segment is assumed to correspond to 1 unit time. The sharing module 123a of the stream sharing apparatus 12 began to execute steps S21 and S23. Since this was the first delivery regarding the stream from the stream source apparatus 10 to the stream sharing apparatus 12, the segments numbered 24 to 30, together having the same length as the first scheduling window (7 unit time), were sent in a batch from the buffer module 101a to the buffer module 121a. The first scheduling window may otherwise specify the numbering of the segments requested by the stream sharing apparatus 12 (such as 24 to 30) and slide forward with time, as shown in FIG. 3B where, at time 1, the seven segments previously received by the stream sharing apparatus 12 were pushed forward in its processing queue, the first scheduling window now indicating that there be segments numbered 25 to 31 in the buffer module 121a, wherein the sharing module 123a only needed to request the last segment from the stream source apparatus 10 (or wait for the stream source apparatus 10 to send it spontaneously). As long as there is no change on the peer-to-peer network, such as a new node joins the network and requests and delivers the stream, the first scheduling window slides forward every unit time and a new segment is sent from the buffer module 101a and stored in the buffer module 121a. At time 60, for instance, the stream sharing apparatus 12 received the segment numbered 90.

Suppose that the adjusting module 125a of the stream sharing apparatus 12 executes step S29 periodically once every 60 unit time. Since the stream sharing apparatus 12 did not upload any segment during time 0 to 60, the segments it processed (numbered 24 to 90) were not recorded with sending time-points. In one embodiment, the sending time-points of a segment not requested or shared can be equated to the time-point at which it leaves the buffer module; that is, the difference between the sending time-points and receiving time-points is the time the segment spends in the buffer module. Assume that the buffer modules 101a, 121a, and 141a described later can each accommodate fifteen segments, with each segment corresponding to 1 unit time. In the example of FIG. 3A and FIG. 3B, the segment numbered 24 would have been pushed out at time 9 to make way for the incoming segment numbered 39. Since the segment numbered 24 was stored at time 0, the adjusting module 125a calculated that the segment had been in the buffer module 121a for 9 unit time. Similarly, given that the segments numbered 31 to 75 were not requested by the stream sharing apparatus 14 and had already left the buffer module 121a to be processed or discarded, each of the segments had spent 15 unit time in the buffer module 121a.

Figure 3C:
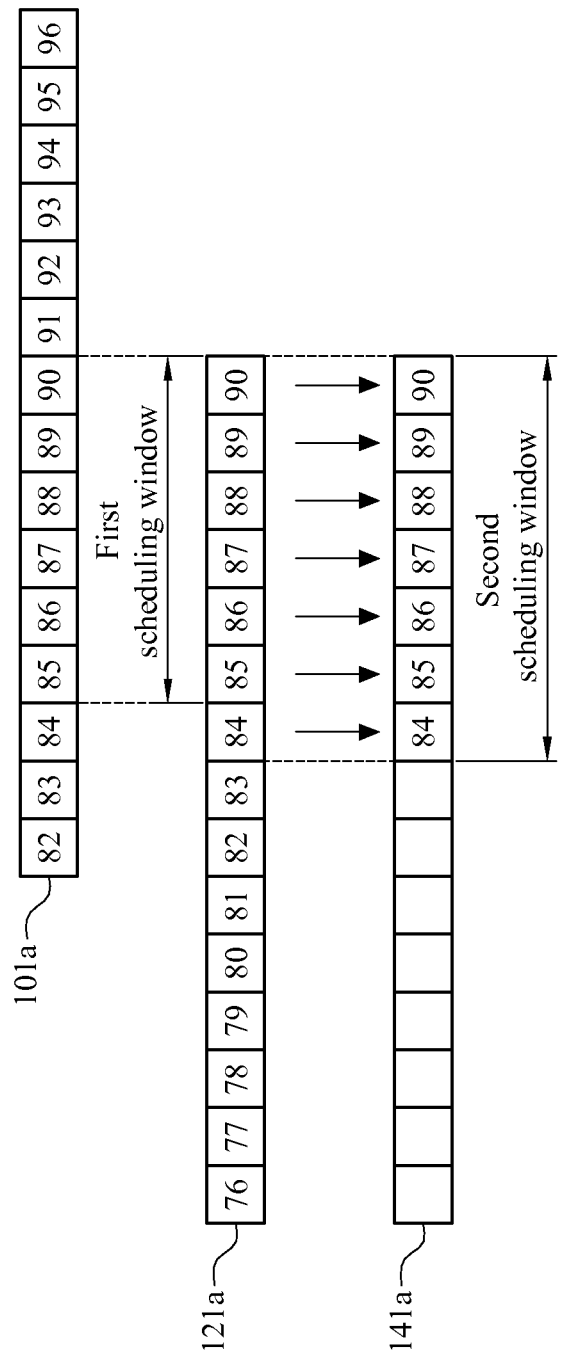
FIG. 3A to FIG. 5B illustrates the sharing of segments between two stream sharing apparatus and a stream source apparatus, in accordance with an embodiment of the present disclosure.

Consequently, assuming the sending time-points of unrequested segments is equivalent to assuming that the differences between the sending time-points and receiving time-points corresponding respectively to these segments are related to the size of the buffer module 121a, or that the average of the differences equals how many unit time of data the buffer module 121a can hold, regardless of how many segments are chosen or what weights given. The adjusting module 125a had observed before time 61 that this average is an initial value of 15 unit time. (The buffer module 121a holds fifteen segments, each of which corresponds to 1 unit time.) In one embodiment, the adjusting module 125a decreases the first scheduling window when the average is larger than an upper bound. Suppose that two thirds of the size of the buffer module 121a (10 unit time) is taken as the upper bound. As shown in FIG. 3C, at time 61, the first scheduling window had already been decreased by a segment or 1 unit time, so there was no segment that the stream sharing apparatus 12 had to immediately obtain from the stream source apparatus 10. In practice, the scheduling window does not have to be adjusted by a constant value or the smallest unit of the stream. For example, the amount of adjustment may be proportional to the degree by which the said average is larger than the upper bound or smaller than the lower bound. In terms of the load of a peer-to-peer network, a high average signifies that the node has poor or relatively restricted network condition (e.g. its upload bandwidth is administered or it has incoming connections blocked by a firewall) and, ranked lower during peer selection, shares segments less frequently; therefore, the larger the average is relative to the upper bound, the more the first scheduling window may be decreased, thereby increasing the difficulty for the node to obtain the latest data in the stream.

Figure 4A:
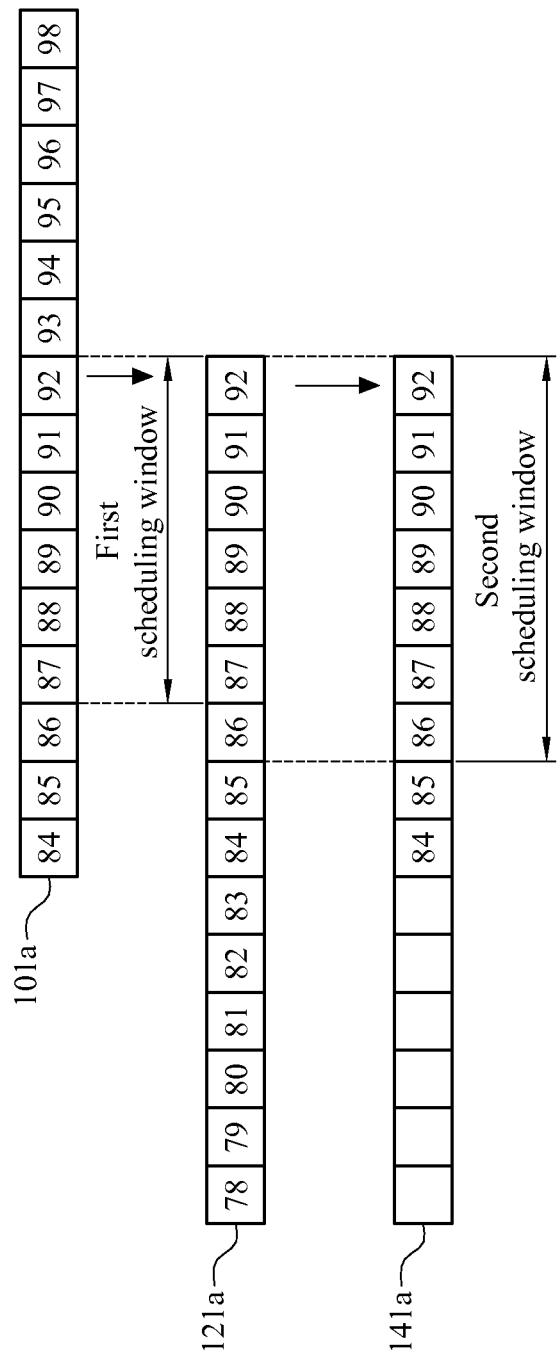

It can be seen from the existence of the buffer module 141a in FIG. 3C that the stream sharing apparatus 14 had also begun requesting the stream from the stream sharing apparatus 12 through some peer selection mechanism. As in FIG. 3A, a plurality of segments numbered 84 to 90, together having the same length as the second scheduling window (7 unit time), were sent in a batch from the buffer module 121a to the buffer module 141a. From time 61 on the adjusting module 125a may more meaningfully calculate the differences between the sending time-points and receiving time-points corresponding respectively to the segments in the buffer module 121a and update the average of these differences often. For example, since the segment numbered 90 was loaded into the buffer module 121a at time 60, the adjusting module 125a calculated the difference between its sending time-points and receiving time-points to be 1. By the same token, the sending and receiving time-point difference of the segment numbered 89 and loaded at time 59 is 2, and so on, with that of the segment labeled 84 being 7. The said average may be calculated in a variety of ways; for instance, the adjusting module 125a may only consider the segments requested so far to calculate it as (1+2+3+4+5+6+7)÷7=4 unit time, or take all the segments remaining in the buffer module 121a to yield an arithmetic average of (1+2+3+4+5+6+7+15× 8)÷15≈9.87 unit time, or give diminishing weights to the requested segments or all the remaining segments, from recent to ancient. In FIG. 3C and subsequent descriptions, it is assumed that the adjusting module 125a calculates the arithmetic average with the requested segments. At time 63, as shown in FIG. 4A, the segments numbered 84 to 92 had been shared, wherein the segments numbered 91 and 92 were received and sent to the stream sharing apparatus 14 by the sharing module 123a respectively at times 62 and 63 (both with time-point difference 0), making the average (0+0+1+ 2+3+4+5+6+7)÷9≈3.11 unit time. (After the stream sharing apparatus 14 had been receiving the stream from the stream sharing apparatus 12 for a while, obviously all the segments in the buffer module 121a would be requested segments.)

Figure 4B:
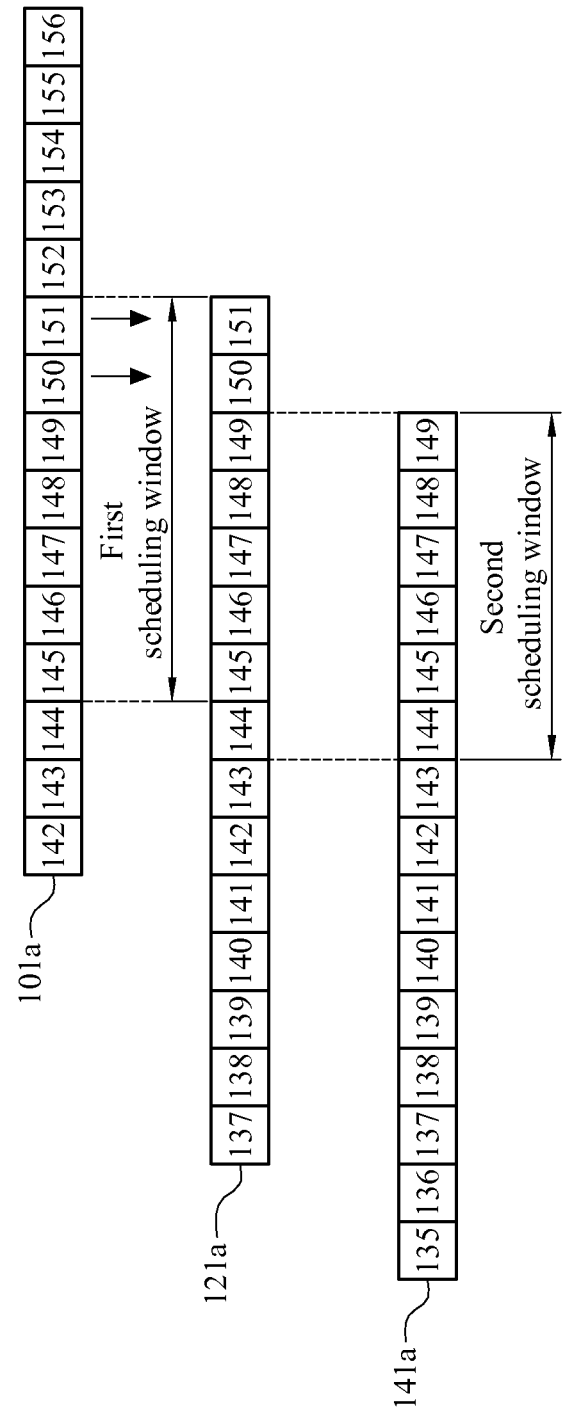

Please note that it has been assumed previously that the adjusting module 125a adjusts the first scheduling window once every 60 unit time, so even though the average had dropped below the upper bound of 10 unit time, the first scheduling window still had a decreased length at time 63, but step S29 would be executed before time 121. In one embodiment, the adjusting module 125a increases the first scheduling window when the average is smaller than a lower bound. Suppose that the lower bound is a third of the size of the buffer module 121a (5 unit time). As shown in FIG. 4B, at time 121, the average had decreased to 0 unit time (the sharing module 123a had been sending segments as soon as receiving them). The first scheduling window is hence increased by a segment or 1 unit time to return to 7 unit time as at time 0, prompting the stream sharing apparatus 12 to obtain the segments numbered 150 and 151 in a batch from the stream source apparatus 10. In terms of the load of the peer-to-peer network, a low average signifies that the node has fine network condition and, ranked higher during peer selection, shares segments more frequently; therefore, the smaller the average is relative to the lower bound, the more the first scheduling window may be increased, thereby increasing the likelihood of the node obtaining the latest data in the stream. Similar to the stream sharing apparatus 12 in FIG. 3C, since the stream sharing apparatus 14 had not yet shared anything (or that the average of the differences between the sending time-points and receiving time-points corresponding respectively to the segments in the buffer module 141a is fixed at 15 unit time), its adjusting module decreased the second scheduling window, and there was no segment that the stream sharing apparatus 14 had to immediately receive from the stream sharing apparatus 12.

Figure 5A:
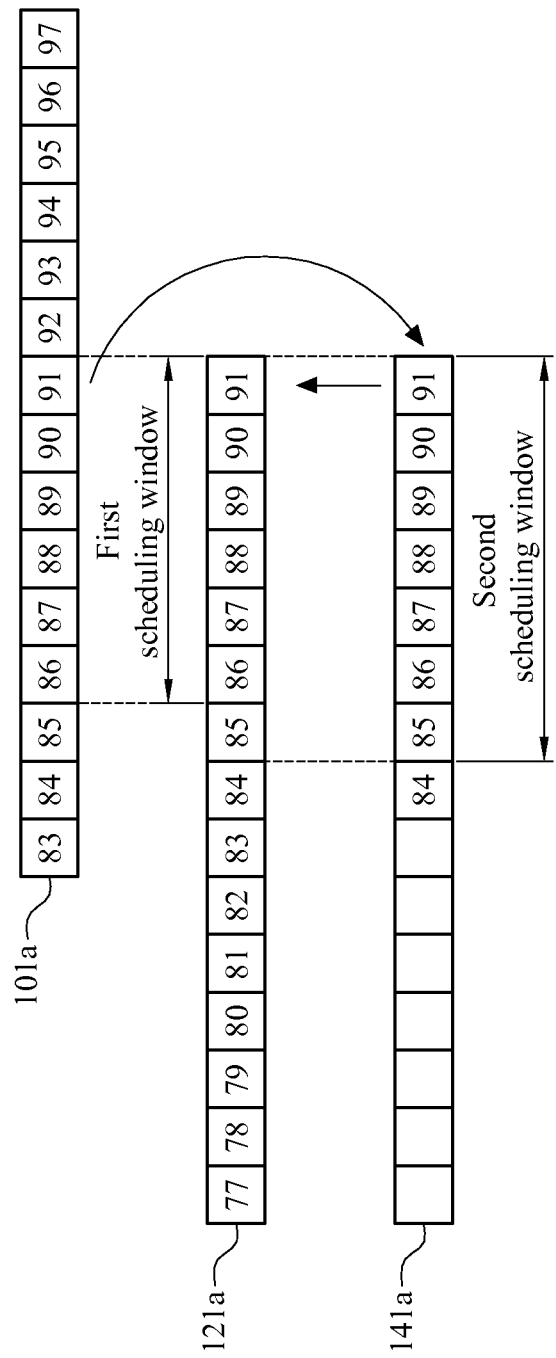
Figure 5B:
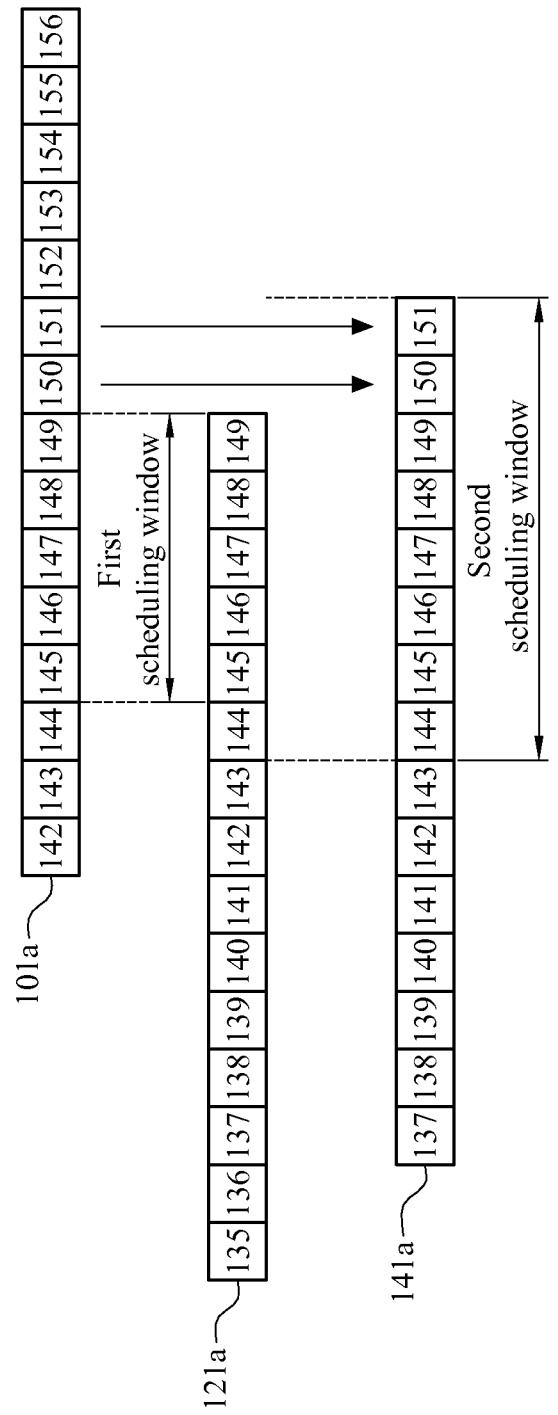

Please refer to FIG. 5A with regard to FIG. 3C. Suppose that at time 62, instead of what happened in FIG. 4A and FIG. 4B, the peer selection mechanism decided that the stream source apparatus 10 should directly send data to the stream sharing apparatus 14, and that the stream sharing apparatus 12 receive segments hereafter from the stream sharing apparatus 14. Consequently, the segment numbered 91 is loaded to the buffer module 121a from the buffer module 101a through the buffer module 141a. This might be due to the network condition of the stream sharing apparatus 14 becoming better than that of the stream sharing apparatus 12 as a result of, say, the computing device implementing the stream sharing apparatus 12 starting up a program that consumes a lot of bandwidth or computing resources at time 62. Prior to time 121, the average of the differences between the sending time-points and receiving time-points corresponding respectively to the segments in the buffer module 121a was still 15 unit time, related to the size of the buffer module 121a and larger than the upper bound, despite that the sharing module 123a had sent seven segments at time 61. It can therefore be noticed in FIG. 5B that the adjusting module 125a had decreased the first scheduling window again. On the other hand, the stream sharing apparatus 14 had been sharing segments with the stream sharing apparatus 12 from time 62 to 121, hence the enlargement of the second scheduling window to 8 unit time, and, as in FIG. 4B, two segments are loaded to the buffer module 141a in a batch.

In one embodiment, the scheduling window cannot be increased or decreased without end. Given that the size of the buffer module is bounded or invariable, having too large a scheduling window is plainly pointless. It can be concluded from FIG. 3A to FIG. 3C, FIG. 4A to FIG. 4B, or FIG. 5A to FIG. 5B that the scheduling window of a stream sharing apparatus involved in sharing tends to get larger, and that of the stream sharing apparatus passively receiving is getting small. In other words, the stream sharing apparatus passively receiving pushes the buffering progress of the sharing stream sharing apparatus closer to the streaming progress of the stream source apparatus 10, the buffer module of the stream sharing apparatus actively sharing becoming more and more parallel to the buffer module 101a. In practice, a scheduling window too small worsens the streaming experience, introducing a media playback phenomenon known colloquially as lag when it is decreased; therefore, there should also be a minimum size for the scheduling window.

Figure 6:
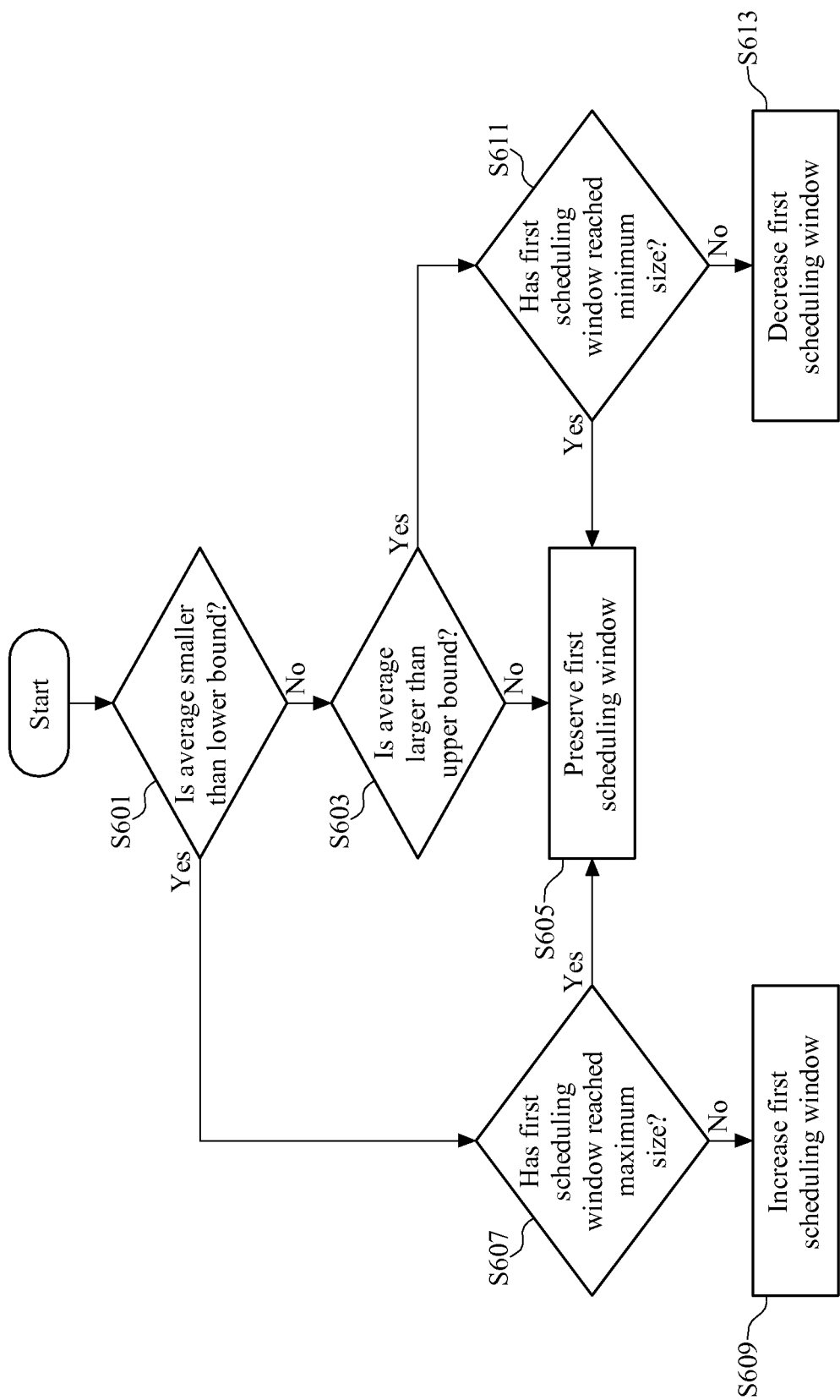
FIG. 6 is a flowchart illustrating the selective adjustment of a first scheduling window, in accordance with an embodiment of the present disclosure.

Specifically, in one embodiment, step S29 in FIG. 2 comprises the procedure illustrated in FIG. 6. After obtaining the average of the differences between the sending time-points and receiving time-points corresponding respectively to the segments in the buffer module 121a, the adjusting module 125a determines in steps S601 and S603 whether the average is smaller than the said lower bound or larger than the said upper bound. If the average is within the lower and upper bounds, the adjusting module 125a simply preserves the current size of the first scheduling window in step S605. If the average is smaller than the lower bound and the adjusting module 125a further determines in step S607 that the first scheduling window has not reached a maximum size, the first scheduling window is increased in step S609. If the average is larger than the upper bound and the adjusting module 125a further determines in step S611 that the first scheduling window has yet to reach a minimum size, the first scheduling window is decreased in step S613. If in step S607 or S611 the first scheduling window has reached the maximum or minimum size, the adjusting module 125a executes step S605.

It should be apparent to persons skilled in the art that embodiments of the present disclosure may arise from varying the number of stream source apparatus, the number of stream sharing apparatus, the temporal correspondence or default length of each segment, the size of the buffer module of each apparatus, how the scheduling window is expressed or bounded, how the differences of time-points are used, how the average of the differences are calculated (including whether and how the average is weighted), the upper or lower bound for comparison with the average, or the amount by which the scheduling window is adjusted. For example, when a stream sharing apparatus concurrently shares with several other nodes, a segment in its buffer module may correspond to a plurality of sending time-points. The adjusting module of that stream sharing apparatus may therefore employ the earliest of these sending time-points or an average or median thereof.

In embodiments of the present disclosure, a stream sharing apparatus independently (but indirectly) examines its network condition as a node according to the sending and receiving time of the segments that it owns. When uploading, the stream sharing apparatus increases the scheduling window to keep up with the streaming progress of the source, becoming a node more suitable for sharing. When unable to share or when it is difficult to upload, the stream sharing apparatus decreases the scheduling window to fetch segments more conservatively, holding up less upstream resources and increasing the usefulness to itself of peer-owned segments. There are many concrete ways in which the scheduling window may be increased or decreased. To summarize the present disclosure, sharing is encouraged and passive nodes suppressed on a peer-to-peer network providing streaming service by adjusting scheduling windows. Since the adjustment is self-adaptive, no overhead, e.g. additional control packets, is introduced to the network.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A stream sharing method, comprising:
    receiving a stream according to a first scheduling window;
    storing a plurality of received segments of the stream in a buffer module, wherein each of the received segments corresponds to a receiving time-point;
    receiving a sharing request comprising a second scheduling window;
    sending one or more requested segments according to the second scheduling window, wherein each of the one or more requested segments is one of the received segments and further corresponds to a sending time-point; and
    adjusting the first scheduling window according to the receiving time-point and the sending time-point corresponding to each of the one or more requested segments;
    wherein adjusting the first scheduling window according to the receiving time-point and the sending time-point corresponding to each of the one or more requested segments comprises:
    for each of the one or more requested segments, calculating a difference between the sending time-point and the receiving time-point corresponding to the requested segment;
    updating an average according to the one or more differences corresponding to the one or more requested segments; and
    adjusting the first scheduling window according to the average, wherein when the average is smaller than a lower bound and the first scheduling window is smaller than a maximum size, the first scheduling window is increased.

2. The stream sharing method according to claim 1, wherein when the average is smaller than the lower bound, the first scheduling window is increased, and when the average is larger than an upper bound, the first scheduling window is decreased.

3. The stream sharing method according to claim 2, wherein when the average is larger than the upper bound and the first scheduling window is larger than a minimum size, the first scheduling window is decreased.

4. The stream sharing method according to claim 3, wherein when the average is neither smaller than the lower bound nor larger than the upper bound, or when the average is smaller than the lower bound and the first scheduling window has reached the maximum size, or when the average is larger than the upper bound and the first scheduling window has reached the minimum size, the first scheduling window is preserved.

5. The stream sharing method according to claim 2, wherein the average has an initial value related to the size of the buffer module.

6. A stream sharing apparatus, comprising:
    a processor, configured to execute functions of modules, the modules comprising:
    a buffer module;
    a sharing module configured to receive a stream according to a first scheduling window, to store a plurality of received segments of the stream in the buffer module, to receive a sharing request comprising a second scheduling window, and to send one or more requested segments according to the second scheduling window, wherein each of the received segments corresponds to a receiving time-point, and each of the one or more requested segments is one of the received segments and further corresponds to a sending time-point; and
    an adjusting module configured to adjust the first scheduling window according to the receiving time-point and the sending time-point corresponding to each of the one or more requested segments;
    wherein when the adjusting module adjusts the first scheduling window according to the receiving time-point and the sending time-point corresponding to each of the one or more requested segments, the adjusting module calculates, for each of the one or more requested segments, a difference of the receiving time-point and the sending time-point corresponding to the requested segment, updates an average according to the one or more differences corresponding to the one or more requested segments, and adjusts the first scheduling window according to the average;
    wherein when the average is smaller than a lower bound and the first scheduling window is smaller than a maximum size, the adjusting module increases the first scheduling window.

7. The stream sharing apparatus according to claim 6, wherein the adjusting module is configured to increase the first scheduling window when the average is smaller than the lower bound, and to decrease the first scheduling window when the average is larger than an upper bound.

8. The stream sharing apparatus according to claim 7, wherein when the average is larger than the upper bound and the first scheduling window is larger than a minimum size, the adjusting module decreases the first scheduling window.

9. The stream sharing apparatus according to claim 8, wherein when the average is neither smaller than the lower bound nor larger than the upper bound, or when the average is smaller than the lower bound and the first scheduling window has reached the maximum size, or when the average is larger than the upper bound and the first scheduling window has reached the minimum size, the adjusting module preserves the first scheduling window.

10. The stream sharing apparatus according to claim 7, wherein the average has an initial value related to the size of the buffer module.

11. A stream sharing system, comprising:
a stream source apparatus configured to host a stream; and
a first stream sharing apparatus comprising:
a processor, configured to execute functions of modules, the modules comprising:
a buffer module;
a sharing module configured to receive the stream from the stream source apparatus or a second stream sharing apparatus according to a first scheduling window, to store a plurality of received segments of the stream in the buffer module, to receive from a third stream sharing apparatus a sharing request comprising a second scheduling window, and to send one or more requested segments to the third stream sharing apparatus according to the second scheduling window, wherein each of the received segments corresponds to a receiving time-point, and each of the one or more requested segments is one of the received segments and further corresponds to a sending time-point; and
an adjusting module configured to adjust the first scheduling window according to the receiving time-point and the sending time-point corresponding to each of the one or more requested segments;
wherein when the adjusting module adjusts the first scheduling window according to the receiving time-point and the sending time-point corresponding to each of the one or more requested segments, the adjusting module calculates, for each of the one or more requested segments, a difference of the receiving time-point and the sending time-point corresponding to the requested segment, updates an average according to the one or more differences corresponding to the one or more requested segments, and adjusts the first scheduling window according to the average;
wherein when the average is smaller than a lower bound and the first scheduling window is smaller than a maximum size, the adjusting module increases the first scheduling window.

12. The stream sharing system according to claim 11, wherein the adjusting module is configured to increase the first scheduling window when the average is smaller than the lower bound, and to decrease the first scheduling window when the average is larger than an upper bound.

13. The stream sharing system according to claim 12, wherein when the average is larger than the upper bound and the first scheduling window is larger than a minimum size, the adjusting module decreases the first scheduling window.

14. The stream sharing system according to claim 13, wherein when the average is neither smaller than the lower bound nor larger than the upper bound, or when the average is smaller than the lower bound and the first scheduling window has reached the maximum size, or when the average is larger than the upper bound and the first scheduling window has reached the minimum size, the adjusting module preserves the first scheduling window.

15. The stream sharing system according to claim 12, wherein the average has an initial value related to the size of the buffer module.

* * * * *